United States Patent
Gross et al.

(10) Patent No.: US 11,947,606 B2
(45) Date of Patent: Apr. 2, 2024

(54) SYSTEMS AND METHODS FOR ENHANCED SEARCH, CONTENT, AND ADVERTISEMENT DELIVERY

(71) Applicant: Zowdow, Inc., Los Angeles, CA (US)

(72) Inventors: William Tod Gross, Pasadena, CA (US); Paul Thomas Ryan, Los Angeles, CA (US)

(73) Assignee: STRONG FORCE TX PORTFOLIO 2018, LLC, Fort Lauderdale, FL (US)

( * ) Notice: Subject to any disclaimer, the term of this patent is extended or adjusted under 35 U.S.C. 154(b) by 206 days.

(21) Appl. No.: 16/235,616

(22) Filed: Dec. 28, 2018

(65) Prior Publication Data

US 2019/0278817 A1  Sep. 12, 2019

Related U.S. Application Data

(63) Continuation of application No. PCT/US2017/040169, filed on Jun. 30, 2017.
(Continued)

(51) Int. Cl.
*G06F 3/048*   (2013.01)
*G06F 3/0484*  (2022.01)
(Continued)

(52) U.S. Cl.
CPC ........ *G06F 16/9532* (2019.01); *G06F 3/0484* (2013.01); *G06F 16/9535* (2019.01);
(Continued)

(58) Field of Classification Search
None
See application file for complete search history.

(56) References Cited

U.S. PATENT DOCUMENTS 6,442,529 B1 * 8/2002 Krishan ............ G06Q 30/0277
                                                    705/14.69
8,176,029 B2   5/2012 Wang
                (Continued)

FOREIGN PATENT DOCUMENTS

CN    101025737 A    8/2007
CN    102640143 A    8/2012
              (Continued)

OTHER PUBLICATIONS

ISA, "PCT Application No. PCT/US17/40169 International Search Report and Written Opinion dated Sep. 15, 2017", 8 pages.
(Continued)

*Primary Examiner* — Hua Lu
(74) *Attorney, Agent, or Firm* — RMCK Law Group, PLC

(57) ABSTRACT

A search engine system generally includes a user interface in a computing environment configured to receive at least a first fragment from a user and a content display module configured to automatically generate an anticipated search result in the computing environment based on at least the first fragment. The content display module is configured to automatically display search results that include an arrangement of a plurality of visual content elements based on the anticipated search result. The content display module is configured to direct the user to content at one of a network and a local destination associated with one of the visual content elements selectable by the user with the user interface.

29 Claims, 7 Drawing Sheets

Related U.S. Application Data

(60) Provisional application No. 62/357,171, filed on Jun. 30, 2016.

(51) Int. Cl.
| | |
|---|---|
| *G06F 16/9532* | (2019.01) |
| *G06F 16/9535* | (2019.01) |
| *G06Q 10/04* | (2023.01) |
| *G06Q 30/0242* | (2023.01) |
| *G06Q 30/0251* | (2023.01) |
| *G06Q 30/0282* | (2023.01) |
| *G06Q 30/0601* | (2023.01) |

(52) U.S. Cl.
CPC ......... *G06Q 10/04* (2013.01); *G06Q 30/0242* (2013.01); *G06Q 30/0257* (2013.01); *G06Q 30/0282* (2013.01); *G06Q 30/0623* (2013.01)

(56) References Cited

U.S. PATENT DOCUMENTS

| | | | | |
|---|---|---|---|---|
| 8,768,766 | B2* | 7/2014 | Ellis | G06Q 30/0275 |
| | | | | 705/14.54 |
| 8,898,148 | B1* | 11/2014 | Yagnik | G06F 16/9535 |
| | | | | 707/721 |
| 9,195,944 | B1* | 11/2015 | Ofitserov | G06F 16/9535 |
| 9,626,158 | B1* | 4/2017 | Ben-Tzur | G06F 3/0482 |
| 9,727,818 | B1* | 8/2017 | Liu | G06F 16/9535 |
| 9,811,566 | B1* | 11/2017 | Kim | G06F 16/951 |
| 10,007,719 | B2 | 6/2018 | Horvitz | G06F 16/332 |
| 2002/0103705 | A1* | 8/2002 | Brady | G06Q 20/202 |
| | | | | 705/14.58 |
| 2005/0165766 | A1* | 7/2005 | Szabo | G06Q 30/0255 |
| 2006/0155751 | A1* | 7/2006 | Geshwind | G06F 16/3338 |
| | | | | 707/999.102 |
| 2007/0156647 | A1* | 7/2007 | Shen | G06F 16/9535 |
| 2009/0240672 | A1* | 9/2009 | Costello | G06F 16/9535 |
| | | | | 705/14.54 |
| 2009/0254512 | A1* | 10/2009 | Broder | G06Q 30/02 |
| 2009/0327270 | A1* | 12/2009 | Teevan | G06F 16/9535 |
| | | | | 707/999.005 |
| 2010/0161385 | A1* | 6/2010 | Karypis | G06Q 10/04 |
| | | | | 709/224 |
| 2011/0131093 | A1* | 6/2011 | Behroozi | G06Q 30/0241 |
| | | | | 707/723 |
| 2011/0153387 | A1* | 6/2011 | Ma | G06Q 10/10 |
| | | | | 705/347 |
| 2011/0231296 | A1* | 9/2011 | Gross | G06Q 10/10 |
| | | | | 705/37 |
| 2011/0289422 | A1* | 11/2011 | Spivack | G06F 16/951 |
| | | | | 715/739 |
| 2012/0047025 | A1* | 2/2012 | Strohman | G06Q 30/0275 |
| | | | | 705/14.71 |
| 2012/0100829 | A1* | 4/2012 | Jackson | G06Q 30/0273 |
| | | | | 455/406 |
| 2012/0102050 | A1* | 4/2012 | Button | G06N 5/043 |
| | | | | 707/E17.014 |
| 2012/0123863 | A1* | 5/2012 | Kaul | G06Q 30/0254 |
| | | | | 705/14.52 |
| 2012/0176509 | A1* | 7/2012 | Aravamudan | H04N 21/258 |
| | | | | 348/E5.031 |
| 2013/0067364 | A1* | 3/2013 | Berntson | G06F 16/951 |
| | | | | 707/723 |
| 2013/0091113 | A1* | 4/2013 | Gras | G06F 16/748 |
| | | | | 707/706 |
| 2013/0157693 | A1* | 6/2013 | Mercuri | H04W 4/21 |
| | | | | 455/456.3 |
| 2013/0159074 | A1* | 6/2013 | Chavan | G06Q 30/0253 |
| | | | | 709/206 |
| 2013/0173398 | A1 | 7/2013 | Wang et al. | |
| 2013/0273968 | A1* | 10/2013 | Rhoads | H04W 4/50 |
| | | | | 455/566 |
| 2014/0201126 | A1* | 7/2014 | Zadeh | A61B 5/165 |
| | | | | 706/52 |
| 2014/0258002 | A1* | 9/2014 | Zimmerman | G06Q 30/0256 |
| | | | | 705/14.72 |
| 2014/0372423 | A1* | 12/2014 | Majumder | G06F 16/9038 |
| | | | | 707/725 |
| 2015/0242761 | A1* | 8/2015 | Amershi | G06F 3/048 |
| | | | | 706/11 |
| 2015/0254252 | A1* | 9/2015 | Khalil | G06F 16/951 |
| | | | | 707/706 |
| 2015/0294014 | A1* | 10/2015 | Reznik | G06F 16/951 |
| | | | | 707/706 |
| 2015/0317945 | A1* | 11/2015 | Andress | G06T 11/00 |
| | | | | 345/592 |
| 2015/0348107 | A1* | 12/2015 | Wu | G06F 16/24575 |
| | | | | 705/14.54 |
| 2016/0078471 | A1* | 3/2016 | Hamedi | G06F 16/90324 |
| | | | | 705/14.41 |
| 2016/0147889 | A1* | 5/2016 | Lakshmanan | G06F 16/9038 |
| | | | | 707/731 |
| 2016/0188575 | A1* | 6/2016 | Sawaf | G06F 40/51 |
| | | | | 704/2 |
| 2016/0189225 | A1* | 6/2016 | Glover | G06F 16/24578 |
| | | | | 705/14.55 |
| 2016/0357745 | A1* | 12/2016 | Chang | G06F 16/338 |
| 2017/0060966 | A1* | 3/2017 | Glover | G06F 16/252 |
| 2017/0154356 | A1* | 6/2017 | Trevisiol | G06Q 30/0277 |
| 2017/0185602 | A1* | 6/2017 | Gusev | G06F 16/951 |
| 2017/0201779 | A1* | 7/2017 | Publicover | H04N 21/4532 |
| 2017/0344609 | A1* | 11/2017 | Wadley | G06F 16/24578 |
| 2020/0193098 | A1* | 6/2020 | Sawaf | G06F 40/51 |

FOREIGN PATENT DOCUMENTS

| | | |
|---|---|---|
| CN | 103092923 A | 5/2013 |
| WO | 2010108157 A2 | 9/2010 |
| WO | WO-2018005903 | 1/2018 |

OTHER PUBLICATIONS

WIPO, "PCT Application No. PCT/US17/40169 International Preliminary Report on Patentability dated Jan. 10, 2019", 7 pages.

* cited by examiner

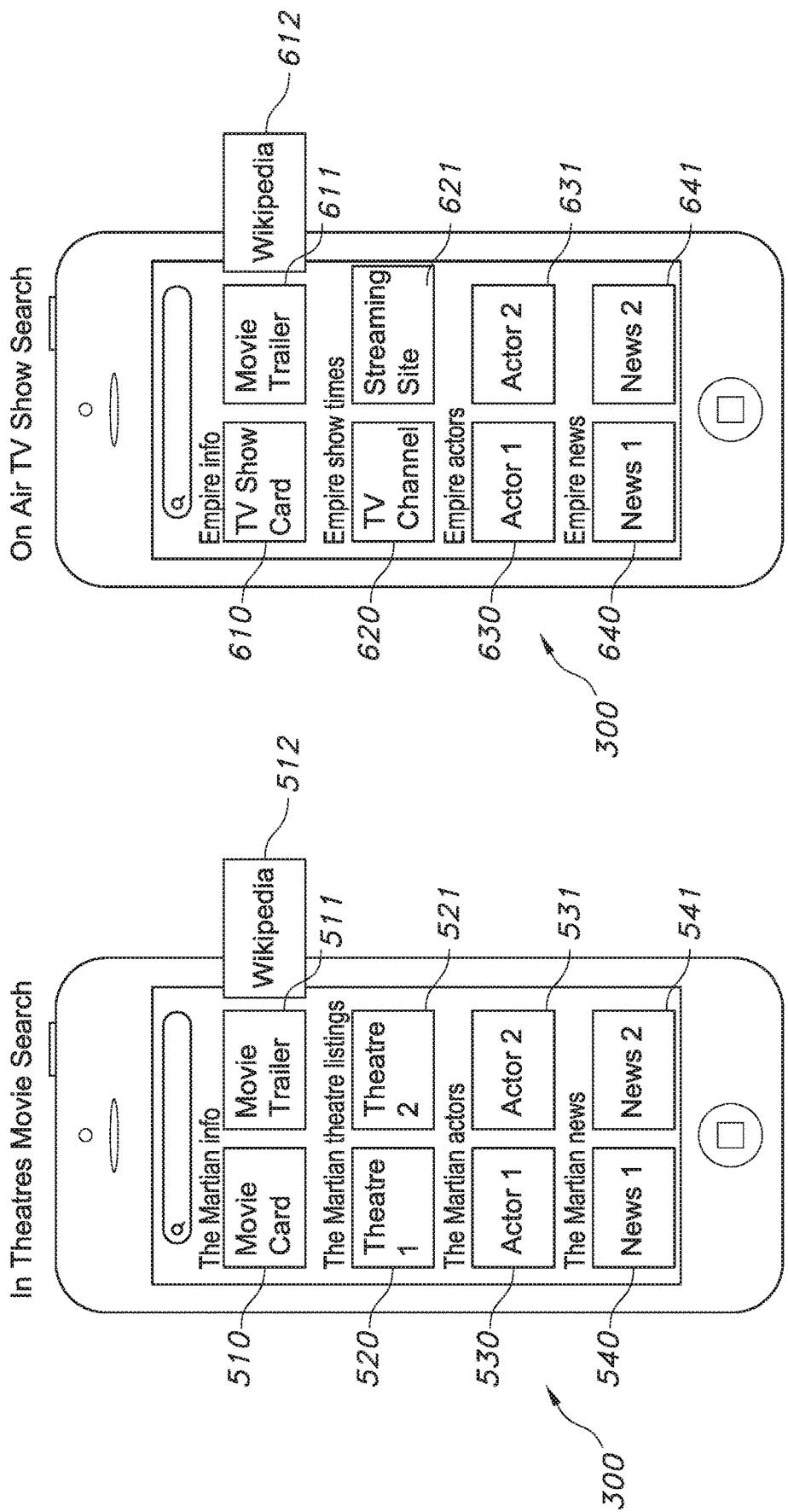

SYSTEMS AND METHODS FOR ENHANCED SEARCH, CONTENT, AND ADVERTISEMENT DELIVERY

CROSS-REFERENCE TO RELATED APPLICATIONS

This application is a continuation filed under 35 U.S.C. § 111(a) that claims priority under 35 U.S.C. § 120 and § 365 (c) to International Application No. PCT/US17/40169, filed on Jun. 30, 2017, which claims the benefit under 35 § 119(e) of U.S. Prov. Pat. App. No. 62/357,171, filed on Jun. 30, 2016, with the entire contents of each of these applications hereby incorporated herein by reference.

TECHNICAL FIELD

This disclosure relates to the field of enhanced Internet search, and more particularly to improved discovery of digital content and delivery of advertising content during an Internet search.

BACKGROUND

The Internet search has become a ubiquitous tool to discover and interact with content, but many search platforms, especially on mobile devices, do not provide a favorable customer experience, frequently resulting in abandoned searches before achieving a desired outcome. In many instances, poor design, difficult and inconvenient query input mechanisms, ineffective search results presentation, and long execution times between query input and search results presentation may be among the many reasons that applications and search engines fail to engage the user of a mobile device when the user is searching for a desired outcome based on content.

SUMMARY

In embodiments, a search engine system includes a user interface in a computing environment configured to receive at least a first fragment from a user and a content display module configured to automatically generate an anticipated search result in the computing environment based on at least the first fragment. The content display module is configured to automatically display search results that include an arrangement of a plurality of visual content elements based on the anticipated search result. The content display module is configured to direct the user to content at one of a network and local destination associated with one of the visual content elements selectable by the user with the user interface.

In embodiments, the user interface is configured to receive at least a second fragment from the user. In embodiments, the content display module is configured to update the plurality of visual content elements based on the anticipated search result generated from a combination of at least the first fragment and the second fragment.

In embodiments, the user interface is configured to receive at least a second fragment from the user and is configured to determine an elapsed time between receiving at least one of the first fragment and the second fragment. In embodiments, the content display module is configured to update the plurality of visual content elements based on the anticipated search result generated from a combination of at least the first fragment and the second fragment.

In embodiments, the system includes a timing module that is configured to monitor the elapsed time between receiving at least the first fragment and the second fragment from the user and a navigational path of the user as indicators of a quality of the anticipated search result generated from the combination of at least the first fragment and the second fragment.

In embodiments, the content display module is configured to automatically display the plurality of visual content elements that are configured to include visual, tactile, and interactive components. In embodiments, the content display module is connected with a machine learning module configured to improve at least one of a selection, an arrangement, and a presentation of the visual, tactile, and interactive components of the visual content elements that provide a direct pathway to one of a website and a local application. In embodiments, an improvement in the at least one of the selection, the arrangement, and the presentation is based on a metric relating to a number of visual content elements with which the user engages before achieving a desired search result.

In embodiments, the content display module is connected with a machine learning module configured to improve at least one of a selection, an arrangement, and a presentation of visual, tactile, and interactive components of the visual content elements configured to direct the user to content at one of a network and a local destination associated with one of the visual content elements selectable by the user with the user interface. In embodiments, an improvement is based on a metric relating to a time required for the user to achieve a desired outcome and based on a metric relating to at least one of the number of visual content elements with which user engages before achieving the desired outcome and a path by which the user engages with a series of visual content elements before achieving the desired outcome.

In embodiments, the content display module is connected with a machine learning module configured to improve at least one of a selection, an arrangement, and a presentation of visual, tactile, and interactive components of the visual content elements configured to direct the user to content at one of a network and a local destination associated with one of the visual content elements selectable by the user with the user interface. In embodiments, an improvement to the at least one of the selection, the arrangement, and the presentation of the visual, tactile, and interactive components of the visual content elements includes at least one of an update of placement of the visual content elements in rows, an update of sizing of the visual content elements, an update of a number of rows depicting the visual content elements, and an update of a size of rows depicting the visual content elements.

In embodiments, the system includes an advertiser bidding engine that is configured to associate advertisement bids with advertising content on the user interface based on at least the anticipated search result.

In embodiments, the user interface includes a timing module that monitors at least the first fragment and at least one of previous search queries and previously visited sites from which search results are produced from the anticipated search result based on at least one of the first fragment, the previous search queries, and the previously visited sites. In embodiments, the timing module is configured to interpret elapsed time of the search and navigation process as an indication of the quality of the search results.

In embodiments, the content display module is configured to automatically generate a set of variants of the visual content elements that represent alternative presentations of the content from one of a website and a local application from available images, video, data, and metadata content. In embodiments, the content display module is configured to rank the visual content elements for display within the user interface based on a combination of factors that may include keyword fragment entry, user intent, and user interaction tracking.

In embodiments, the content display module includes a user intent ontology engine that is configured to automatically add and/or remove links between members of a set of keywords and keyword fragments to members of a user intent ontology, such as based on tracking outcomes of interactions of users with the visual content elements that are at least one of generated, selected, arranged, and presented based on an understanding of a combination of at least a keyword, the first fragment, a second fragment, and an intent.

In embodiments, the user interface is configured to detect signals from a user computer device to automatically infer an intent of the user during idle time associated with the user computer device. In embodiments, the user interface is configured to present visual content elements for engaging the user during the idle time.

In embodiments, the system includes a keyword user intent ontology engine configured to link members of a set of keyword fragments and keywords to members of a user intent ontology.

In embodiments, the content display module is connected with a machine learning module configured for optimizing a marketplace in which a sponsor can bid on a right to place at least one of the visual content elements based on a type of intent of the user and of a user computer device on which the at least one of the visual content elements is placed.

In embodiments, the machine learning module is configured to determine automatically at least one of a minimum price and a right to bid based a determined extent of a relationship between the visual content elements and the type of the intent of the user based on tracking outcomes of users having an applicable type of intent when engaging with advertising content having similar characteristics to the visual content elements. In embodiments, the system includes a user interaction tracking module configured for tracking user interactions with the visual content elements.

In embodiments, the user interaction tracking module is configured to provide feedback for an optimization of at least one of finding, generating, presenting, arranging the visual content elements. In embodiments, the user interaction tracking module is configured to track behavior of the user including tracking at least one of a tap, a swipe, a force tap, and a dwell time.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. The many embodiments of the present disclosure are illustrated by way of example and not limitation in the figures of the accompanying drawings, and in which:

FIG. 5 is a diagrammatic view of a predetermined arrangement of visual content elements relating to search results about theater and movie information in accordance with the various embodiments of the present disclosure;

FIG. 6 is similar to FIG. 5 and shows a predetermined arrangement of visual content elements relating to search results about a live television show;

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Figure 1:
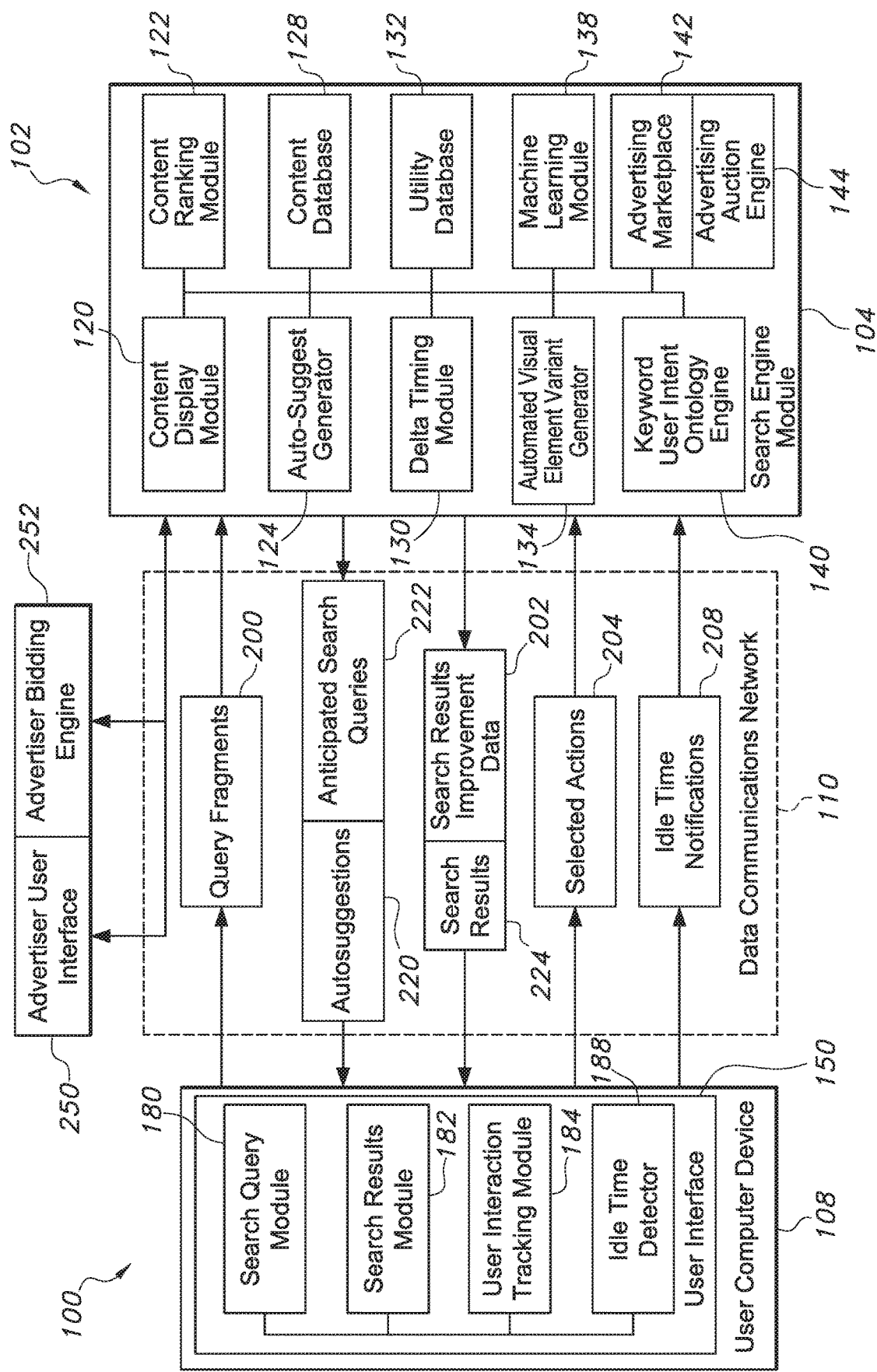
FIG. 1 is diagrammatic view of a technology stack and computing environment of a search engine system connected with a user interface and advertiser bidding infrastructure in accordance with the various embodiments of the present disclosure.

FIG. 1 depicts an exemplary technology stack and computing environment 100 for a search engine system 102 in accordance with the various embodiments of the present disclosure. The search engine system 102 may include a search engine module 104 connected to user computer device 108 and a data communication network 110. The search engine module 104 may include or integrate with a content display module 120, a content ranking module 122, an auto-suggest generator 124, a content database 128, a delta timing module 130, a utility database 132, an automated visual element variant generator 134, a machine learning module 138, a keyword user intent ontology engine 140, and an advertising marketplace 142. The advertising marketplace 142 may include an advertising auction engine 144.

Figure 2:
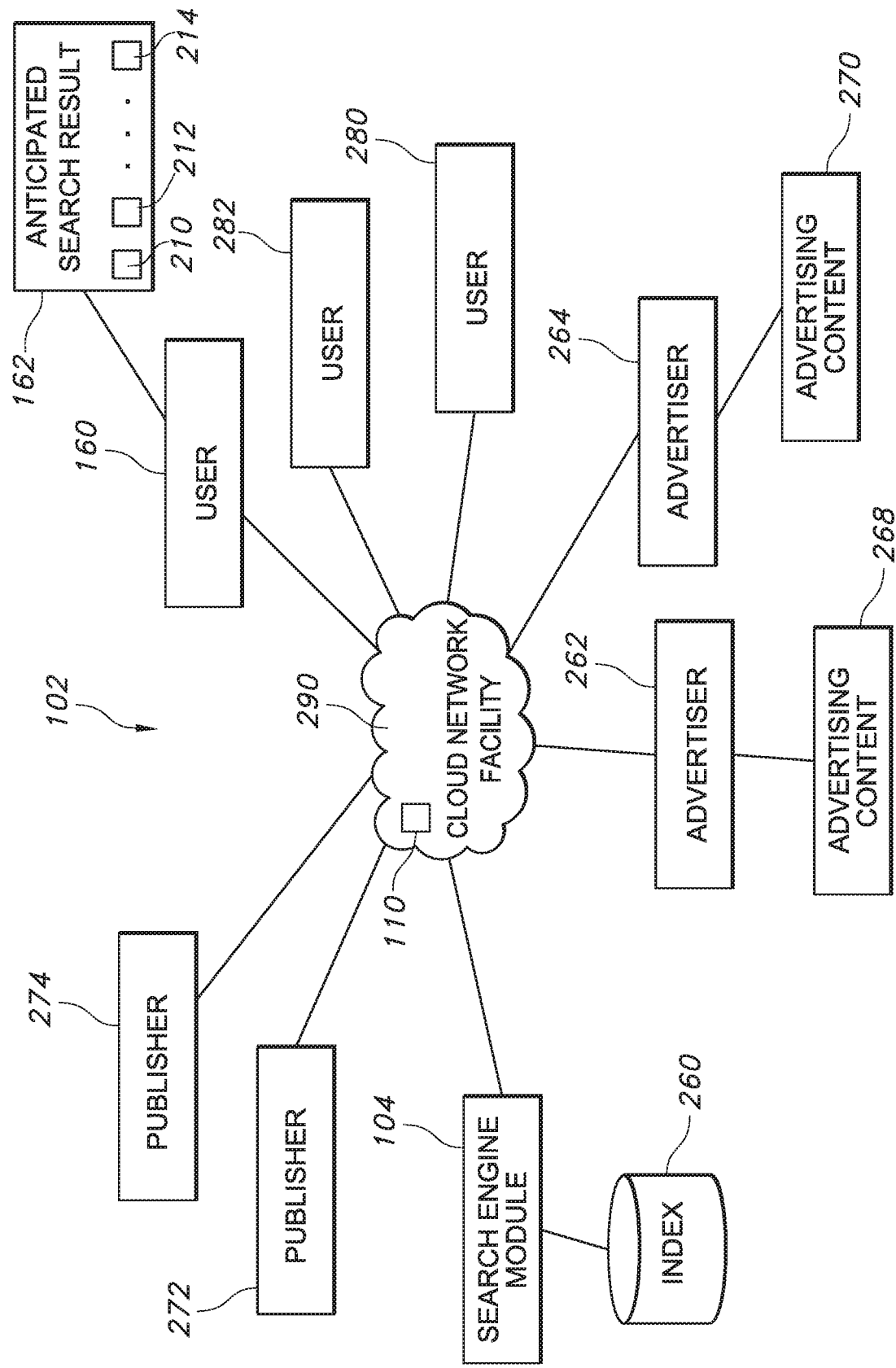
FIG. 2 is diagrammatic view of a high-level system architecture of the search engine system of FIG. 1 in accordance with the various embodiments of the present disclosure.

The user computer device 108 may include a user interface 150 that may take the form of a website, a native operating system application, a mobile application, and the like. The user interface 150 may allow a user 160 (FIG. 2) to begin to enter a search string to produce an anticipated search result 162 (FIG. 2). From there, the user interface 150 may present search results 224 from the data communications network 110. The user interface 150 may include a search query module 180, a search results module 182, a user interaction tracking module 184, and an idle time detector 188.

The user interface 150 may connect to or integrate with the search engine module 104. The user interface 150 may connect to the search engine module 104 through the data communications network 110. The user interface 150 may send query fragments 200, search results improvement data 202, selected actions 204, and idle time notifications 208 to the search engine module 104. With reference to FIG. 2, the query fragments 200 (FIG. 1) may include a first fragment 210, a second fragment 212, and additional fragments 214 such as a third fragment, a fourth fragment, and so on. With reference to FIG. 1, the search engine module 104 may send auto-suggestions 220 that may include the anticipated search result 160, anticipated search queries 222, and search results 224. The search results 224 may include search results improvement data 202. The auto-suggestions 220 may include the additional query fragments 200 that can be used to complete search terms (by adding them to the fragments from the user) and thus provide one or more anticipated search queries 222. The auto-suggestions 220 may also include the additional query fragments 200 that can be used to complete search terms (by adding them to the fragments from the user) and, in turn, provide one or more anticipated search results 162 so that the auto-suggestions 222 may complete the query and provide the anticipated search result 162.

The search engine system 102 may also include an advertiser user interface 250 and advertiser bidding engine 252. An advertiser user interface 250 and advertiser bidding engine 252 may connect to each other and to the search engine module 104.

FIG. 2 depicts an exemplary high-level system architecture of the search engine system 102 in accordance with the various embodiments of the present disclosure. With further reference to FIG. 2 and continuing reference to FIG. 1, the search engine system 102 may include the search engine module 104 that may include a search index 260 for interfacing with users and advertisers such as the user 160 and advertisers 262, 264. The search engine system 102 may generate the search results 224 for the user 160 that may include content sourced from websites, advertising content 268, 270 provided by advertisers 262, 264 and from publishers 272, 274. For the user 160, the search engine module 130 may include or be integrated with a website or mobile software application comprising both hardware and software configured to provide the systems and methods disclosed herein. The user interface 150 can be configured to enable the user 160 to enter search queries or fragments thereof, view autocomplete suggestions 220, and interact with the search results 224. The advertiser user interface 250 may enable the advertisers 262, 264 to bid on predefined keywords and word segments that may match up to, be based on, or be generated from the query fragments 200 from the user 160 including the anticipated search result 162, the first fragment 210, the second fragment 212, and the additional fragments 214. Successful bidding, therefore, may result in having selected advertising content 268, 270 integrated in the search results 224. The user 160, 280, 282 and advertisers 262, 264 may communicate with the search engine 130 via the data communications network 110 that can be deployed in one or more cloud network facilities 290 that can include or integrate with the data communication network 110.

The search results 224 can be arranged and displayed in the visual content elements 300. The search engine module 104 may include the content display module 120 to automatically organize and display content in the visual content elements 300. The content display module 120 may automatically generate the visual content elements 300, from available images, video, data and metadata content about a website or an application. The content display module 120 may also generate variants of visual, tactile, and interactive components of the visual content elements 300 that may represent alternative presentations of the content.

As depicted in FIG. 2, the search engine module 104 may include the machine learning module 152. The machine learning module 152 may use machine learning to improve at least one of the selection, arrangement, and presentation of visual, tactile, interactive components of the visual content elements 300 that may provide a direct pathway to a website or an application. The direct pathway includes directing the user 160 to content at a network destination associated with one of the visual content elements 300 selectable by the user 160 with the user interface 122. Improvement for automated improvement elements, may relate to the selection of the visual content elements 300, the placement of the visual content elements 300 in rows, the sizing of the visual content elements 300, the number of rows of the visual content elements 300, the size of rows that display the visual content elements 300, and other factors.

The machine learning module 152 may learn to improve at least one of the selection, the arrangement, or the presentation of the visual content elements 300 using metrics. The metrics may relate to the number of the visual content elements 300 with which the user 160 may engage before achieving a desired outcome path to an internal (on device) destination, a network destination, a local system destination, or the like. The metrics may relate to the time required for the user 160 to achieve the desired outcome. Improvement for automated improvement and selection of the visual content elements 300 may relate to the selection of the visual content elements 300, the placement of the visual content elements 300 in rows, the sizing of the visual content elements 300, the number of rows depicting the visual content elements 300, the size of rows containing the visual content elements 300, and other factors.

Figure 3:
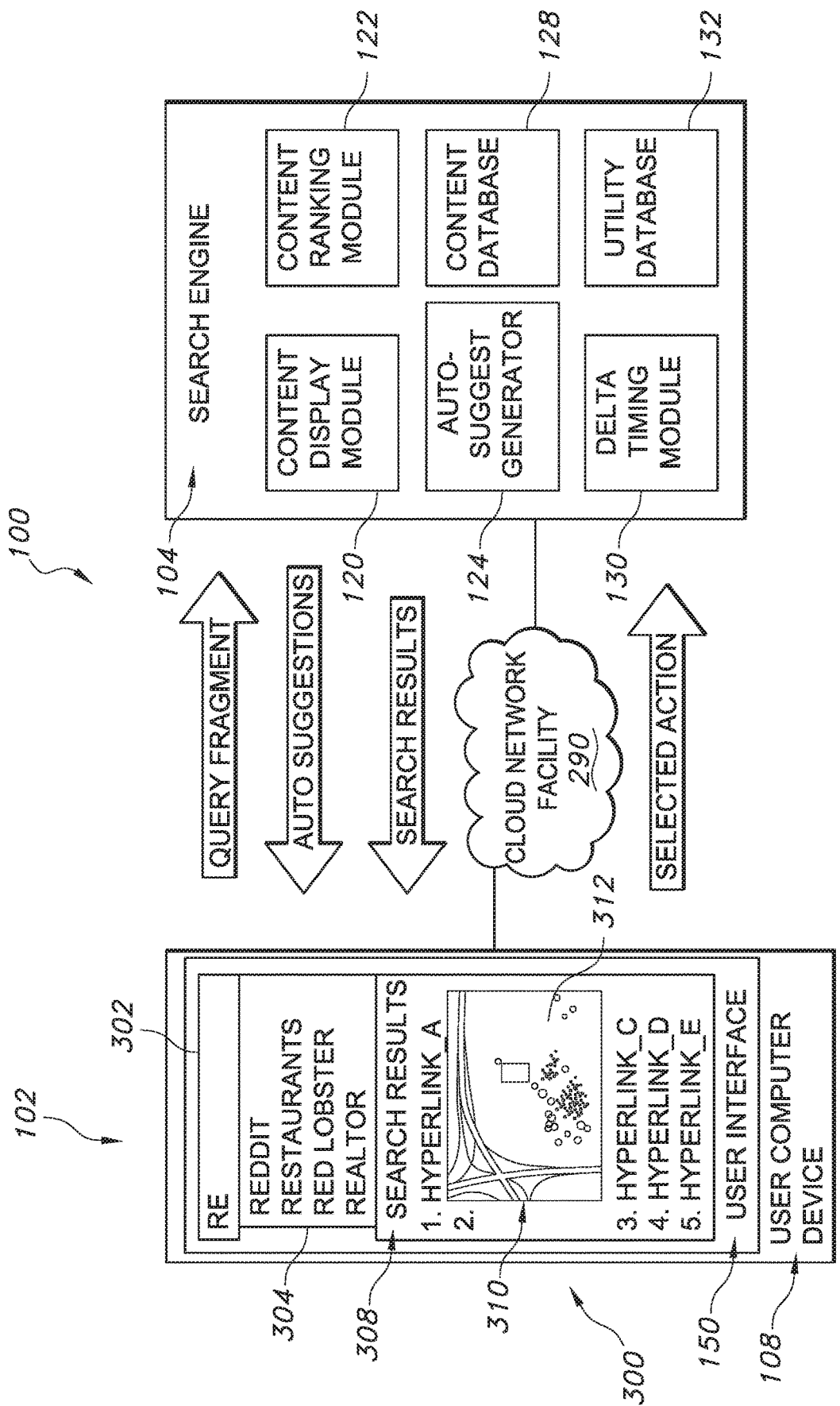
FIG. 3 is a diagrammatic view of an exemplary search engine system for performing the search operations in accordance with the various embodiments of the present disclosure.

FIG. 3 depicts the search engine 130 and an exemplary user interface 150 during a keyword search operation. The user 160 may connect with the user computer device 108 which may generally be a personal computer, a cellular phone, or other mobile computing devices. In the case of a mobile phone, the user interface 150 may include a browser or software app including a query box 302 for entering a keyword or the initial characters of a keyword referred to herein a "fragment." The keyword, or fragment of a keyword, may be transmitted to the search engine 130 and relevant content returned to the user 160 and displayed. This content may include possible auto-suggestions 304, conventional search result listings 308, including hyperlinks to websites and other World Wide Web content, to an internal (on device) destination, a network destination, a local system destination, or the like. The content may also include structured results 310 in which conventional search results 308 may be synthesized into a meaningful format or graphic that can be readily utilized and acted on by the user 160 without the need to click through to a target page represented by a hyperlink in the search result listings. "Auto-suggestions" may be anticipatory of an entire search query and, as such, may amount to an anticipated search query. "Auto-suggestions" may also be updated as letters that may be added to a fragment.

As shown in FIG. 3, the fragment may be the text string "RE" typed by the user. The auto-suggestions include the words:

"REDDIT"
"RESTAURANTS"
"RED LOBSTER," and
"REALTOR."

By way of this example, the structured result 310 may include a graphic of a map 312 that depicts the location of restaurants in proximity to the user 160 at that moment in time.

To the right in FIG. 3 is an exemplary search engine module 104 in accordance with the present disclosure. The search engine module 104 includes the content display module 120 for generating relevant search results 302 from one or more sources and federating the search results 302. The search engine module 104 also includes the content ranking module 122 for determining the optimum ranking of the results using relevancy information as well as completion times as described in more detail below. The search engine module 104 also includes the auto-suggest generator 124 for selecting in real-time, a plurality of popular queries that match the keyword or keyword fragment entered by the user. The search engine module 104 also includes the content database 128 with search index including content and pointers to content available for search results.

In accordance with the embodiments of the present disclosure, the search engine 104 of the present disclosure further includes the delta timing module 130 for computing the "completion time," i.e., the elapsed time between the delivery of the search results 224 and the completion of the action that triggered the search by the user 160. That is, if the query was interpreted as a question, the delta time would be the elapsed time between the question and the answer. In embodiments, the time necessary to answer the user's questions is deemed to be a measure of the utility of the search result selected by the user. By way of this example, the shorter the delta time, the greater the utility of the search result. The utility of the search results 224 are recorded in the utility database 132 and used to generate auto-the suggestions 222 and an anticipated search result 162, select search result content, and rank the selected content. Selected content may be ranked by the content ranking module 122. The content ranking module 122 may rank content using a ranking algorithm. The content ranking algorithm may use a combination of keyword fragment entry, user intent, and user interaction tracking, such as tracking user taps, swipes, force taps, dwell time and the like, to rank visual, tactile, interactive content elements for presentation to users.

With reference to FIG. 1, determination of user intent may include idle intent detection in accordance with embodiments of the present disclosure. In embodiments, the search engine module 104 may detect idle intent using an idle time detector 188. By way of this example, an idle time detector 188 may detect signals from the user computer device 108 to infer an intent of the user 160 to use idle time with the user computer device 108. An idle time detector 188 may use context to intuit the intent of the user 160. Upon detection of idle intent, the search engine module 104 may present the visual content elements 300 for engaging the user during idle time, such as popular news and entertainment content (as compared to providing information for addressing a non-idle intent, such as an intent to find a restaurant or the like). In embodiments, presentation of the visual content elements 300 upon detection of idle intent may include providing guided intent to a user, guiding a user through a set of information to search, and the like. This may include providing information that the user may have wished to find, had the user known the information was available to search.

In embodiments, the idle time detector 188 may include an idle interface and idle buttons. By way of this example, an idle interface and intent buttons may be used by a user when a user intends to pass idle time using a mobile device. In embodiments, the idle time detector 188 may detect idle intent and, upon such detection, may present the idle interface or idle buttons. In embodiments, the idle time detector 188 may generate an idle time alert when idle time is detected. In embodiments, an idle interface may be displayed on a lock screen of a device and be activated when a user interacts with an idle interface, such as by "swiping-left" on the phone's lock screen.

In embodiments, user intent may also include or be associated with a user intent ontology. The user intent ontology may be formed by the keyword user intent ontology engine 140 that may link members of a set of keywords and keyword fragments to members of the user intent ontology. In embodiments, the user intent ontology may be searchable. Searching the user intent ontology may yield a set of possible intentions and an associated probability of each intention happening. In embodiments, the user intent ontology may act as a form of a classifier for the strength of a specific intent based on text entry of one or more fragments from the user 160.

In embodiments, the keyword user intent ontology engine 154 may automatically add and remove links between members of a set of keywords and keyword fragments to members of a user intent ontology. The links may be based on tracking outcomes of interactions of various users 160 with the visual content elements 300 that are at least one of generated, selected, arranged, and presented based on an understanding of a combination of a keyword or keyword fragment and an intent by the user.

In embodiments, keyword fragments and keywords may be automatically linked to or removed from the user intent ontology by the user intent ontology engine 140. Automatically adding and removing links between members of a set of keywords and keyword fragments to members of a user intent ontology, may include automatic removal of intents, such as by collapsing user intents and discarding user intents that are not used or validated with respect to a given keyword or fragment (where validation may occur by tracking outcomes of inferring a given user intent from a keyword or fragment, such as tracking user engagement with content and advertisements that are generated based on the inferred or linked user intent). This may optimize and therefore omit any unhelpful intents for a fragment for a user 120, a group of users 120, or all users, such as by only keeping links that improve interaction rates, or by maintaining a user intent ontology based on feedback of user interactions with content (such as the visual content elements described herein) that reflect user intent and identifying true positives.

In embodiments, automatically adding and removing links between members of a set of keywords and keyword fragments to members of a user intent ontology may improve upon current partitioning approaches, such as determining whether or not to collapse two user intents that are highly correlated, breaking up a single intent into multiple intents and the like.

In embodiments, automatically adding and removing links between members of a set of keywords and keyword fragments to members of a user intent ontology may allow the search engine system 102 to include a keyword and intention marketplace, where keywords with a probability of an intention are linked for purposes of bidding on the keyword-intention combination.

In embodiments, a visual content element may be presented that contains visual content including text content that may be appropriate for a given inferred intent, such as an intent inferred from a fragment of a keyword. By way of this example, the fragment or keyword may be linked to the user intent ontology, which may be, in turn, linked to various types of content (i.e., visual images, photos, video and text) that may be associated with the visual content element 300, which may take the form of a visual card, ribbon, box, or the like, such that an appropriate group of visual content elements 300 may be presented that reflect possible intents of a user as the user begins to enter one or more of the query fragments 200 (i.e., the first fragment 210, the second fragment 212, and the additional fragments 214, as applicable. In embodiments, a keyword and intention marketplace may include automatically generating digital content, such as the above-referenced visual cards or other visual content elements that contain content from selected data sources, including automatically pulling data from available sources and automatically presenting the data in various approaches, such as using different size images, different image arrangements, different fonts, different font sizes, etc. In embodiments, a keyword and intention marketplace may also include automatically presenting a visual content element based on an understood user intent (such as any of a variety that may be included in a user intent ontology) and adjusting representation of data by varying and selecting different representations based on tracking outcomes.

Figure 4:
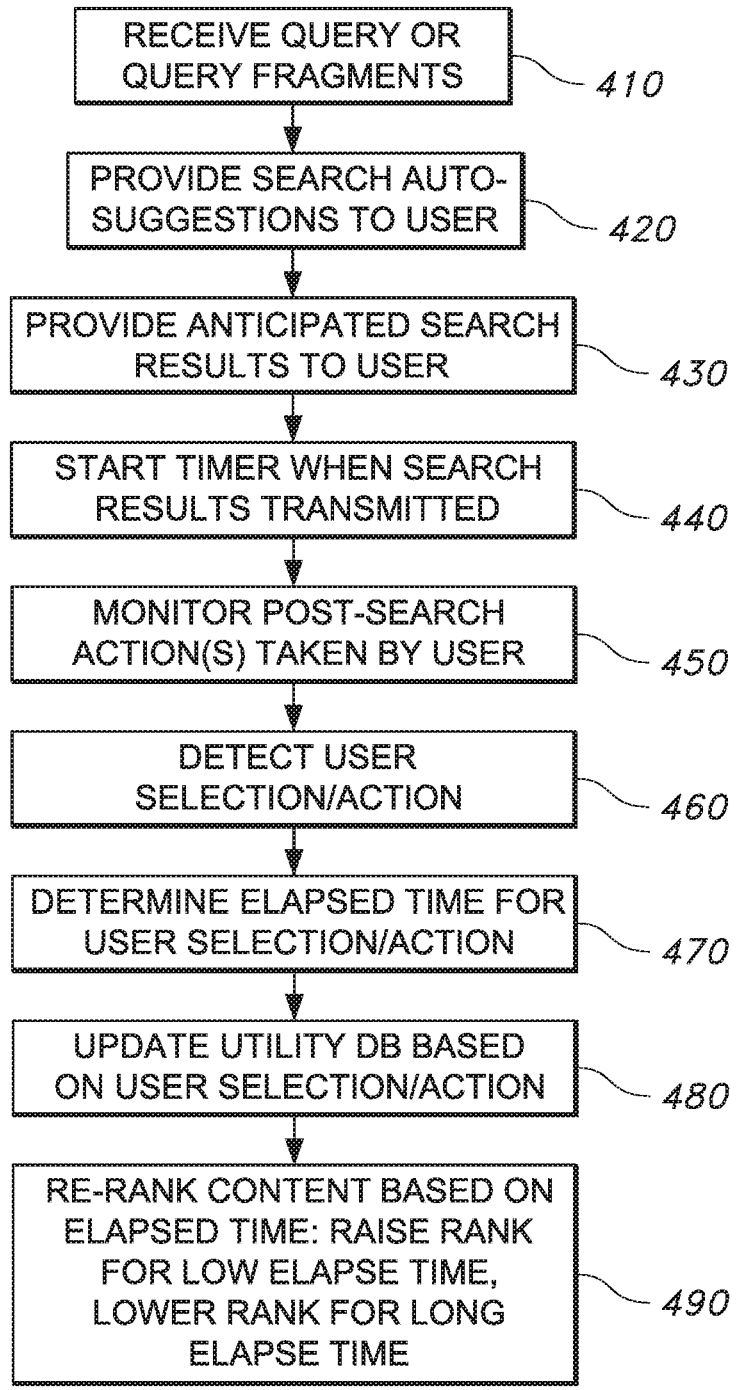
FIG. 4 is a flowchart of the method depicting various embodiments of the present disclosure.

FIG. 4 depicts an exemplary method of executing a search in accordance with the embodiments of the present disclosure. First, the user enters a keyword, or a fragment of a keyword, into a mobile search application of another search tool. In embodiments, the fragment(s) (i.e., the first fragment 210, the second fragment 212, and the additional fragments 214 as needed) may be is transmitted to and received at 410 at the search engine module 104 where it is processed. The search engine module 104 may then identify one or more complete keyword phrases based on the keywords or fragments provided by the user based on popular keyword phrases provided by past users. In embodiments, these popular keyword phrases may be presented at 420 to the user as auto-suggestions in a drop-down menu 304 in FIG. 3. Thereafter, the search engine module 104 may provide a list of search results 224 based on the keywords manually entered by the user or the selection of an auto-suggestion at 430.

In embodiments, the search engine module 104 may use elapsed time and navigational path information as indicators of search result quality. In embodiments, the search engine module 104 may include a timer or the idle time detector 188 to measure elapsed time. The timer may monitor a fragment of a search query and at least one of previous search queries, as well as previously visited sites from which search results 224 are produced. In embodiments, the search results 224 may be anticipatory of an entire search query but derived from at least one of the fragments of a search query, the previous search queries and the previously visited sites, wherein the timer may interpret an elapsed time of a search and navigation process as an indication of the quality of the search results 224.

When the search results 224 are transmitted to the user (or the user selects a particular search result), the delta-timing module 130 may start a timer at 440. This timer may be configured to measure the elapsed time until completion of the transaction, as well as the navigational path of the transaction, i.e., when and through what actions the user has acquired the answer, completed the task, or achieved the result that prompted the initial search. The search engine module 104 may monitor at 450 the user activity for evidence that the user has achieved the desired outcome. When the search engine module 104 determines at 460 that the user has taken a particular action or selected a particular function that signifies the completion of the task, the delta timing module 130 may stop at 470 and the elapsed time may be recorded at 480 in the utility database 132. In embodiments, this elapsed time may be associated with the selected search result and may represent a measure of the utility of that search result with respect to that query. In embodiments, the search engine module 104 may, thereafter, determine relevance and ranking of subsequent search results 224 based, in part, on the utility measure of the present search result. That is, future search results 224 may be ranked at 490 higher or lower relative to other search results 224 in response to the present search, thereby providing a mechanism to deliver only the most relevant search results 224 yielding the shortest time to completion of the task.

The following is an example of how the various embodiments may be implemented. The user enters the fragment "u" in the search field 302 of the present search engine interface. In response, the search engine module 104 may record a first time, T1, and may transmit the following phrases as auto-suggestions:

"U2"
"uses"
"UNITED AIRLINES"
"UNIVISION"

In proximity to the auto-suggestions, information about the first auto-suggestion (i.e., U2) is displayed next to or below the list of auto-suggestions. If and when the user taps on a U2 link, e.g., a U2 SPOTIFY link, the search engine module 104 may cause the SPOTIFY™ app to launch to an internal SPOTIFY™ page including the U2™ channel. If and when the user sees the U2™ channel and taps on the "play" button, the search engine module 104 may deem the user's task to be completed and may record a second time, T2. The difference between T2 and T1 may represent the elapsed time to complete the user's request.

The search engine module 104 may track the elapsed time as well as the user's navigational path from the initial entry of the "u" fragment (here being the first fragment 210) until the user takes action at the U2™ SPOTIFY™ page. In embodiments, the total elapsed time to completion is then used to weight this path u->U2->SPOTIFY for this user. In addition, the elapsed time to completion may also be used to weight the same path for the groups to which this user belongs including, for example, ANDROID™ users, currently located on the east coast of the United States, as well as other user context information. By weighting this path, the search engine module 104 may, in embodiments, change the probability of this path being selected and/or presented to the user 160 relative to other paths that could be presented to the user 160. That is, the relevance of this path above may be increased if the elapsed time is shorter, or the relevance of this path may be reduced if the elapsed time is longer.

FIG. 5 through FIG. 8 are exemplary search results pages for specialized content depicting predetermined arrangements for the visual content elements 300. If the user searches for a movie presently running in theaters, for example, the search results 224 with the highest utility may be retrieved from the search index of the content database 128 and those results may be used to populate the template shown. In the template, the search engine module 104 may generate a search results page with one of the predetermined arrangements including a plurality of rows, each row including a specific class or category of information.

In the example in FIG. 5, the user may be searching for the movie "The Martian" which may produce the results depicted as visual content elements 300 including a first row with a list of general information and links 510, 511, 512, a second row with a list of theaters 520, 521 playing the movie, a third row with a list of actors 530, 531 in the movie, and a fourth row with news articles 540, 541 about the movie. In embodiments, the general information may include the director's name and reviews 520, for example, a link to the movie trailer 521, and a link to Wikipedia™ 512 or other online encyclopedias to find more comprehensive information.

In the example in FIG. 6, the user is searching for a television show which may produce the results depicted as visual content elements 300 including a first row with a list of general information and links 610, 611, 612, a second row with a list of links to view the TV show 620, the movie 621, a third row with a list of actors 630, 631 in the TV show, and a fourth row with news articles 640, 641. In embodiments, the general information may include the director's name and reviews 620, for example, a link to the movie trailer 621, and a link to Wikipedia™ 612 or other online encyclopedias to find more comprehensive information.

Figure 7:
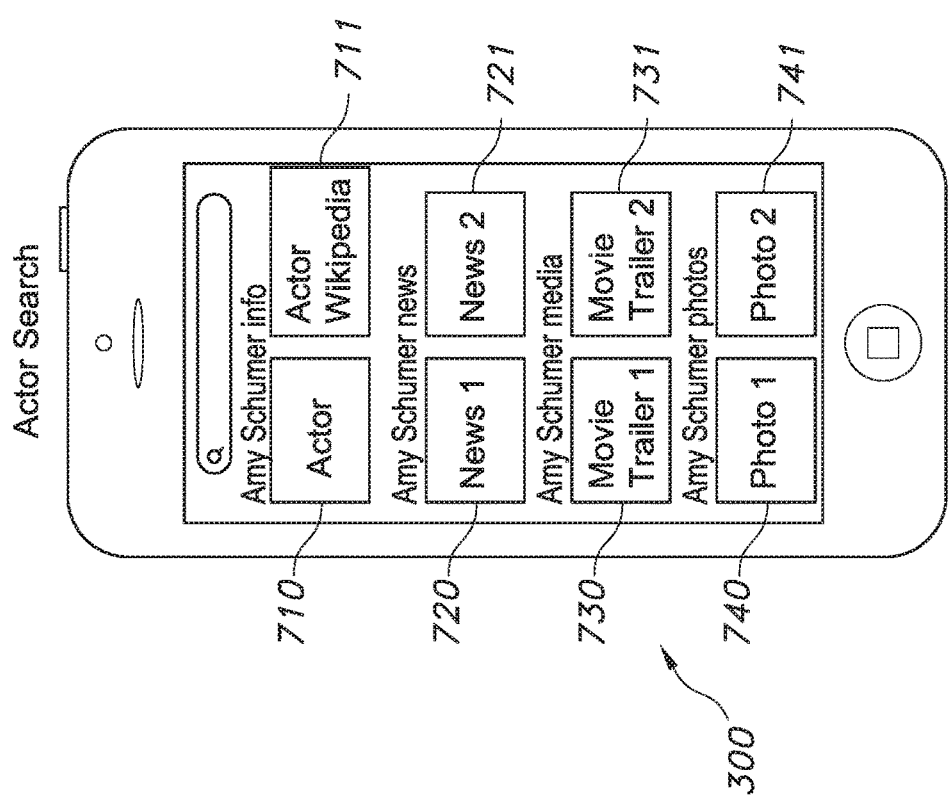
FIG. 7 is similar to FIG. 5 and shows a predetermined arrangement of visual content elements relating to search results about actors.

In the example in FIG. 7, the user is searching for a particular actor which may produce the results depicted as visual content elements 300 including a first row with a list of general information and links 710, 711, a second row with a list of links to news articles 720 about the actor and Tweets™ 721 from the actor or other SMS messages, a third row with a list of movies or TV shows 730, 731 in which the actor has appeared, and a fourth row with photographs 740, 741 of the actor. In embodiments, the general information may include the actor's age and place of birth 720, for example, and a link to Wikipedia™ 711 or other online encyclopedias to find more comprehensive information.

Figure 8:
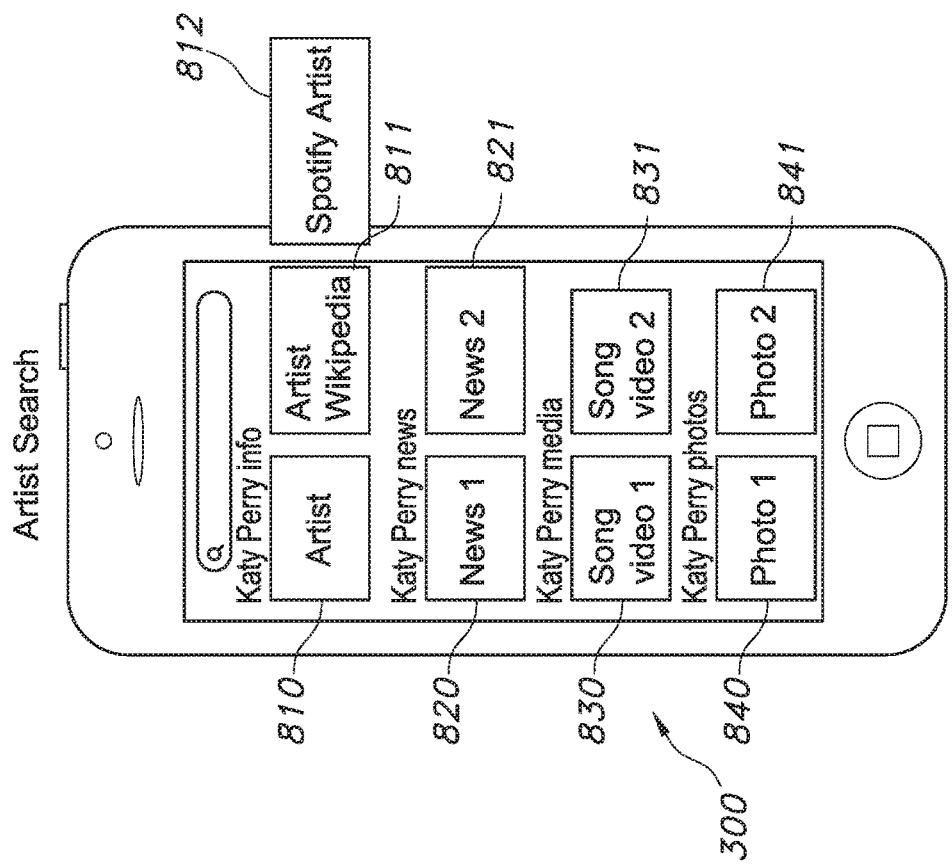
FIG. 8 is similar to FIG. 5 and shows a predetermined arrangement of visual content elements relating to search results about artists.

In the example in FIG. 8, the user is searching for a particular music artist which may produce the search results 224 depicted as visual content elements 300 including a first row with a list of general information and links 810, 811, 812, a second row with a list of links to news 820 about the music artist and Tweets™ or other SMS messaging 821 from the artist, a third row with links to songs or music videos 830, 831 of the music artist, and a fourth row with photographs 840, 841 of the music artist. In embodiments, the general information may include the music artist's age and place of birth 820, for example, and a link to Wikipedia™ 811 or other online encyclopedias to find more comprehensive information, and a link to one or more music sites 812 where the music artist is played.

In embodiments, the search engine module 104 may be configured to receive bids from advertisers for complete keywords as well as keyword fragments. For each particular keyword, the total number of fragments available for auction is equal to the number of letters in the keyword, in the fragments, or other phrases (or single words) to search. That is, advertisers can bid on one or more of the fragment where the fragments differ by a little as a single letter. For example, the search engine module 104 may enable, for example, seventeen different auctions for the phrase "Chinese restaurant" with one auction for each fragment beginning with "c," "ch," "chi," "chin," "chine," etc. Although the search engine module 104 can support seventeen different auctions, some of these auctions will be selected and some will not be selected based on price and performance considerations. In particular, an advertiser may choose to bid on a small set of fragments optimized to provide a return on investment by analyzing the probability of the user clicking through the ad as well as the delta time described above. In embodiments, only the highest performing fragments are selected and the ad incorporated in the search results 224.

Figure 9:
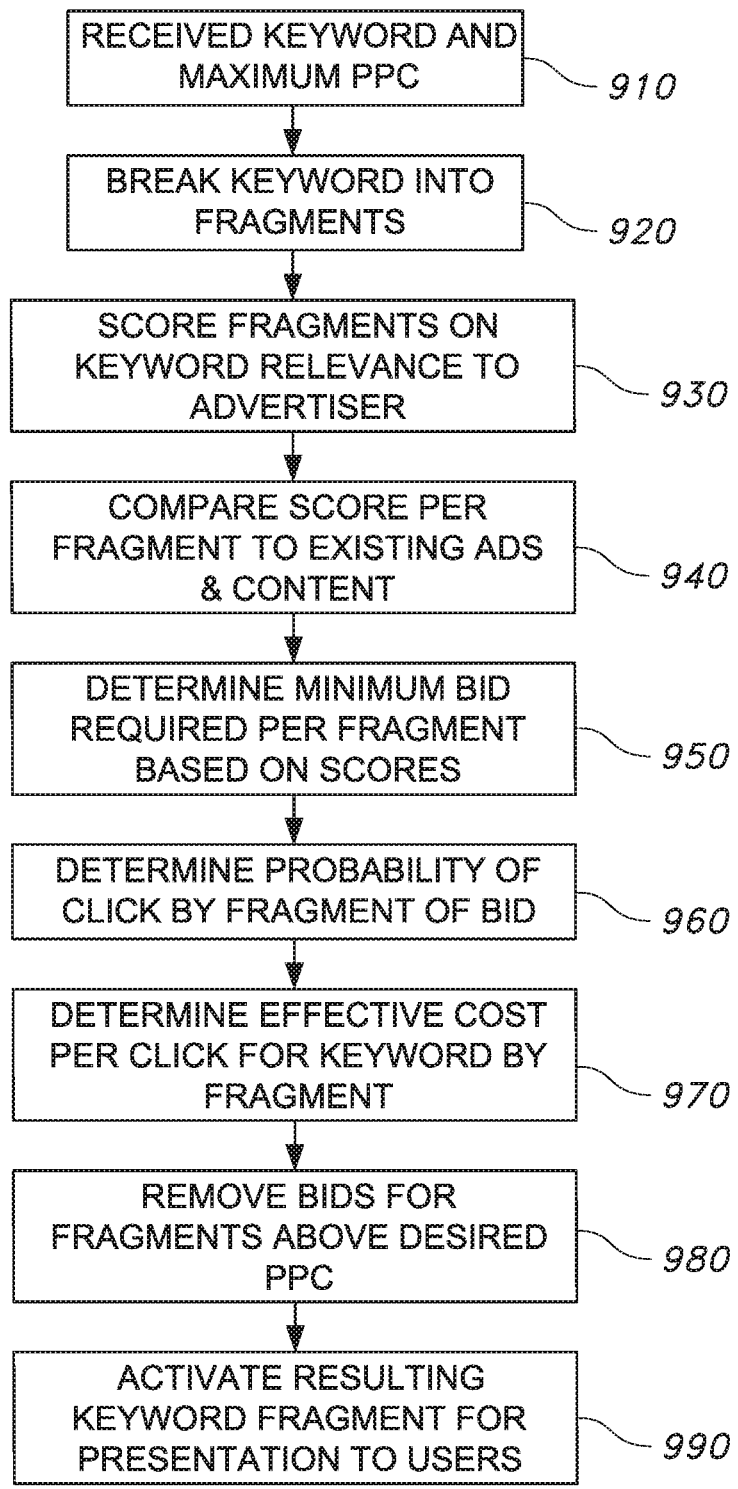
FIG. 9 is a flowchart of a method of analyzing a fragment bid in accordance with the various embodiments of the present disclosure.

Illustrated in FIG. 9 is a flowchart of the process of identifying keyword fragments for which ad campaigns are activated and ads delivered in response to those fragments. To start, the advertiser may transmit at 910 to the search engine module 104 a keyword of interest to the advertiser as well as the maximum price-per-click (PPC) or price-per-thousand-impressions (PPM) or price-per-user-action (PPA) such as an application download or application activation the advertiser is willing to pay for the click-through. As such, the received keyword may then be parsed or broken down at 920 into a plurality of fragments, the number of fragments about equal to the number of letters in the keyword.

In embodiments, the search engine module 104 reviews at 930 each fragment and the potential set of existing keywords that share this fragment, and rates the likelihood that the fragment corresponds to the end-user intention and the advertiser's keyword or fragment. This score of relevance may be expressed as a percentage of the time the user intends the advertiser's keyword or fragment (e.g., 3.4%, versus 96.6% for something else) when the user has only typed the particular fragment. The relevance score of each fragment is compared at 940 to the keyword and other ads that share that fragment, and rates (scores) of the advertiser's content against the content having the same fragment by other advertisers.

The machine learning module 152, referenced earlier in this disclosure, may also optimize a marketplace in which an advertiser can bid on the right to place a content element based on a type of intention of a user of a device on which the content element will be placed, wherein at least one of a minimum price and a right to bid is set using machine learning based a determined extent of relationship between the content and the intent as indicated by tracking outcomes of users having the applicable type of intent when engaging with content having similar characteristics to the content element.

Next, the search engine module 104 may determine at 950 the minimum bid required per fragment by setting the minimum bid required to "overcome" the relevance deficits (if any) from the corresponding relevancy score at 930 and rates at 940, including the current bid from the other potential advertisers for the fragment. In addition, the search engine module 104 calculates at 960 the probability of payable user events (e.g., impressions, clicks, purchase, download, or other action) from the advertiser given the required bid.

Thereafter, the search engine module 104 may compare at 970 the expected cost per event calculated at 960 with the price the advertiser is willing to spend at 910. If there are fragments that are cost prohibitive due to the maximum prices set (PPC, PPM, or PPA), for example, the search engine module 104 may "turn off" the bids for those fragments and launch at 990 the campaign for the remaining fragments having the same or lower PPC, PPM, or PPA, than the original keyword.

For example, if an advertiser wants a price per click (PPC) to be $2.50 on average, and the keyword is 'games', then the search engine module 104 may compute the PPC bid for the exact keyword (e.g.: $2.35 for "games") with the bids for each substring of "games" to meet this maximum PPC as follows:

"games" at $2.35
"game" at $2.15
"gam" at $1.45
"ga" at $1.00
"g" at $0.45

However, the search engine will also determine the minimum required PPC for the keyword "games" and each of its fragments based on the machine learning model that predict user behavior when a user is presented with content after typing the fragments as follows:

"games" minimum PPC $1.50
"game" minimum PPC $1.55
"gam" minimum PPC $1.60
"ga" minimum PPC $4.75
"g" minimum PPC $17.50

In embodiments, the first two fragments for the keyword "games" are both below the advertiser-desired maximum PPC as well as above the search engine mandated minimum PPC for the fragment, whereas the "gam" fragment will may not be cost effective and may not meet the advertiser's goals, may have its bid amount set to $0, as would the subsequent fragments "ga" and "g."

Detailed embodiments of the present disclosure are disclosed herein; however, it is to be understood that the various disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms 'comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A search engine system comprising:
  a user interface in a computing environment configured to receive at least a first fragment from a user;
  a content display module configured to automatically generate a plurality of anticipated search results in the computing environment based on at least the first fragment, wherein the content display module is configured to automatically display search results that include an arrangement of a plurality of visual content elements, wherein each of the plurality of visual content elements is based on one of the plurality of anticipated search results, the visual content elements including at least a portion of one of an image and a video, wherein the content display module is configured to automatically generate a set of variants for at least one of the plurality of the visual content elements that represent alternative presentations of content from available images, video, data, and metadata content from at least one of the plurality of anticipated search results, and wherein the content display module is configured to direct the user to content at one of a network and local destination associated with one of the visual content elements selectable by the user with the user interface; and a machine learning module trained, based on times to achieve a desired user outcome, to predict and indicate search result presentation data to the content display module, wherein the times to achieve the desired user outcome correspond to elapsed times between: (i) when search results are transmitted to the user or the user selects a particular search result, and (ii) when the user has completed a transaction associated with achieving the desired user outcome, and wherein the times to achieve the desired user outcome are inversely proportional to a utility of the search results such that: (i) a shorter time corresponds to a higher utility of the search results, and (ii) a longer time corresponds to a lower utility of the search results.

2. The system of claim 1 wherein the user interface is configured to receive at least a second fragment from the user, and wherein the content display module is configured to update the plurality of visual content elements based on an anticipated search result generated from a combination of at least the first fragment and the second fragment.

3. The system of claim 1 wherein the user interface is configured to receive at least a second fragment from the user and is configured to determine an elapsed time between receiving at least one of the first fragment and the second fragment and the second fragment and a third fragment, and wherein the content display module is configured to update the plurality of visual content elements based on search results from an anticipated search result generated from a combination of at least the first fragment and the second fragment.

4. The system of claim 3 wherein further comprising a timing module that is configured to monitor the elapsed time between receiving at least the first fragment and the second fragment from the user and a navigational path of the user as indicators of a quality of the anticipated search result generated from the combination of at least the first fragment and the second fragment.

5. The system of claim 1 wherein the content display module is configured to automatically display the plurality of visual content elements that is configured to include visual, tactile, and interactive components.

6. The system of claim 1 wherein the machine learning module is configured to provide an improvement in the at least one of the selection, the arrangement and the presentation based on a metric relating to a number of visual content elements with which the user engages before achieving a desired search query.

7. The system of claim 1 wherein the machine learning module is configured to provide an improvement based on a metric relating to a time required for the user to achieve a desired outcome and based on a metric relating to at least one of the visual content elements with which user engages before achieving the desired outcome and a path by which the user engages with a series of visual content elements before achieving the desired outcome.

8. The system of claim 1 wherein the presentation of the visual, tactile, and interactive components of the visual content elements includes at least one of an update of placement of the visual content elements in rows, an update of sizing of the visual content elements, an update of a number of rows depicting the visual content elements, and an update of a size of rows depicting the visual content elements.

9. The system of claim 1 further comprising an advertiser bidding engine that is configured to associate advertisement bids with advertising content on the user interface based on at least the one of the plurality of anticipated search results.

10. The system of claim 1 wherein the user interface includes a timing module that monitors at least the first fragment and at least one of previous search queries and previously visited sites from which search results are produced from the plurality of anticipated search results based on at least one of the first fragment, the previous search queries, and the previously visited sites, wherein the timing module is configured to interpret elapsed time of the search and navigation process as an indication of a quality of the search results.

11. The system of claim 1 wherein the content display module is configured to rank the visual content elements within the user interface based on a combination of factors including keyword fragment entry, user intent, and user interaction tracking.

12. The system of claim 1 wherein the content display module includes a user intent ontology engine that is configured to automatically add and remove links between members of a set of keywords and keyword fragments to members of a user intent ontology based on tracking outcomes of interactions of users with the visual content elements that are at least one of generated, selected, arranged, and presented based on an understanding of a combination of at least a keyword, the first fragment, and an intent.

13. The system of claim 1 wherein the user interface is configured to detect signals from a user computer device to automatically infer an intent of the user during idle time associated with the user computer device, and wherein the user interface is configured to present visual content elements for engaging the user during the idle time.

14. The system of claim 1 further comprising a keyword user intent ontology engine configured to link members of a set of keyword fragments and keywords to members of a user intent ontology.

15. The system of claim 1 wherein the machine learning module is configured for optimizing a marketplace in which a sponsor can bid on a right to place at least one of the visual content elements based on a type of intent of the user and a user computer device on which the at least one of the visual content elements is placed.

16. The system of claim 15 wherein the machine learning module is configured to determine automatically at least one of a minimum price and a right to bid based on a determined extent of a relationship between the visual content elements and the type of the intent of the user based on tracking outcomes of users having an applicable type of intent when engaging with advertising content having similar characteristics to the visual content elements.

17. The system of claim 1 further comprising a user interaction tracking module configured for tracking user interactions with the visual content elements.

18. The system of claim 17 wherein the user interaction tracking module is configured to provide feedback based on the tracked user interactions with the visual content elements for an optimization of the visual content elements.

19. The system of claim 18 wherein the user interaction tracking module is configured to track behavior of the user including tracking at least one of a tap, a swipe, a force tap, and a dwell time.

20. A search engine system comprising:
a set of processors that execute computer executable instructions that when executed cause the set of processors to:
train a machine learning model, based on times to achieve a desired user outcome, to predict and indicate search result presentation data, wherein the times to achieve the desired user outcome correspond to elapsed times between: (i) when search results are transmitted to a user or the user selects a particular search result, and (ii) when the user has completed a transaction associated with achieving the desired user outcome, wherein the times to achieve the desired user outcome are inversely proportional to a utility of the search results such that: (i) a shorter time corresponds to a higher utility of the search results, and (ii) a longer time corresponds to a lower utility of the search results;
receive at least a first fragment from a user via a user interface in a computing environment;
automatically generate an anticipated search result in the computing environment based on at least the first fragment;
automatically display search results that include an arrangement of a plurality of visual content elements based on the anticipated search result;
detect signals from a user computer device to automatically infer an intent of the user during idle time associated with the user computer device;
apply the trained machine learning model to present alternate visual content elements in the user interface for engaging the user during the idle time, the alternate visual content elements including at least one of news and entertainment content; and
direct the user to content at one of a network and local destination associated with one of the visual content elements selectable by the user within the user interface.

21. The system of claim 20 wherein the alternate visual content elements presented for engaging the user during the idle time include content configured to guide the user through a set of information to subsequently search.

22. The system of claim 21 wherein the set of information includes content selected by a search engine module to be of interest to the user.

23. The system of claim 20 wherein the visual content elements include at least a portion of one of an image and a video.

24. The system of claim 20 wherein the computer executable instructions that when executed further cause the set of processors to automatically generate a set of variants of the visual content elements that represent alternative presentations of the content from one of a website and a local application from available images, video, data, and metadata content.

25. A computer implemented method, comprising:
training, by a computing device having one or more processors, a machine learning model, based on times to achieve a desired user outcome, to predict and indicate search result presentation data, wherein the times to achieve the desired user outcome correspond to elapsed times between: (i) when search results are transmitted to a user or the user selects a particular search result, and (ii) when the user has completed a transaction associated with achieving the desired user outcome, wherein the times to achieve the desired user outcome are inversely proportional to a utility of the search results such that: (i) a shorter time corresponds to a higher utility of the search results, and (ii) a longer time corresponds to a lower utility of the search results;
receiving, by the computing device, at least a first fragment from a user via a user interface in a computing environment;
automatically generating, by the computing device, an anticipated search result in the computing environment based on at least the first fragment;
automatically displaying, by the computing device, search results that include an arrangement of a plurality of visual content elements based on the anticipated search result;
detecting, by the computing device, signals from a user computer device to automatically infer an intent of the user during idle time associated with the user computer device;
applying, by the computing device, the trained machine learning model to present alternate visual content elements in the user interface for engaging the user during the idle time, the alternate visual content elements including at least one of news and entertainment content; and
directing, by the computing device, the user to content at one of a network and local destination associated with one of the visual content elements selectable by the user within the user interface.

26. The computer implemented method of claim 25, wherein the alternate visual content elements presented for engaging the user during the idle time include content configured to guide the user through a set of information to subsequently search.

27. The computer implemented method of claim 26, wherein the set of information includes content selected by a search engine module to be of interest to the user.

28. The computer implemented method of claim 25, wherein the visual content elements include at least a portion of one of an image and a video.

29. The computer implemented method of claim 25, further comprising automatically generating, by the computing device, a set of variants of the visual content elements that represent alternative presentations of the content from one of a website and a local application from available images, video, data, and metadata content.

* * * * *